United States Patent
McLeod (10) Patent No.: US 7,622,903 B2
(45) Date of Patent: Nov. 24, 2009

(54) EMI REJECTION FOR TEMPERATURE SENSING DIODES

(75) Inventor: Scott C. McLeod, Oro Valley, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 860 days.

(21) Appl. No.: 11/219,151

(22) Filed: Sep. 2, 2005

(65) Prior Publication Data
US 2007/0055473 A1    Mar. 8, 2007

(51) Int. Cl.
*G05F 1/573* (2006.01)
*G01K 7/00* (2006.01)

(52) U.S. Cl. .................... 323/278; 374/178
(58) Field of Classification Search ......... 323/276–278, 323/281; 702/130; 374/178, 173, 168; 307/651
See application file for complete search history.

(56) References Cited

U.S. PATENT DOCUMENTS

| | | | |
|---|---|---|---|
| 3,672,215 A | | 6/1972 | Stout et al. |
| 3,679,992 A | | 7/1972 | Yerman |
| 3,898,554 A | * | 8/1975 | Knudsen ............... 323/281 |
| 4,016,763 A | * | 4/1977 | Grindheim ............ 374/173 |
| 4,220,041 A | * | 9/1980 | Potter .................. 73/61.46 |
| 4,228,684 A | | 10/1980 | Templin |
| 5,195,827 A | | 3/1993 | Audy et al. |
| 5,419,637 A | | 5/1995 | Frye et al. |
| 5,982,221 A | | 11/1999 | Tuthill |
| 6,008,685 A | * | 12/1999 | Kunst ................. 374/E7.035 |
| 6,097,239 A | * | 8/2000 | Miranda et al. ........ 374/178 |
| 6,169,442 B1 | | 1/2001 | Meehan et al. |
| 6,480,127 B1 | * | 11/2002 | Aslan ................... 374/178 |

(Continued)

FOREIGN PATENT DOCUMENTS

DE    3637250 A1    6/1987

(Continued)

OTHER PUBLICATIONS

Shen-Whan Chen, Trung Duong and Min-Yih Luo; "Channel Temperature Measurement Using Pulse-Gate Method"; IEEE Transactions on Microwave Theory and Techniques; Mar. 1999; pp. 362-365; vol. 47, No. 3.

(Continued)

*Primary Examiner*—Adolf Berhane
*Assistant Examiner*—Jue Zhang
(74) *Attorney, Agent, or Firm*—Meyertons Hood Kivlin Kowert & Goetzel, P.C.; Jeffrey C. Hood (57) ABSTRACT

In one set of embodiments, a circuit may be implemented to deliver accurately ratioed currents to a remotely located semiconductor device that has a substantially non-linear input-output characteristic that varies with temperature and is subject to effects of electromagnetic interference (EMI). The circuit may be configured to use common mode rejection by establishing an identical impedance at each of the two terminals of the remotely located semiconductor device, in lieu of coupling shunting capacitor(s) across the terminals, in order to reject EMI signals while performing temperature measurements using the remotely located semiconductor device. This may facilitate maintaining fast sampling times when performing temperature measurements, while providing a more effective method for handling EMI induced currents that may lead to temperature measurement errors, thereby eliminating those errors.

26 Claims, 3 Drawing Sheets

U.S. PATENT DOCUMENTS

| | | | |
|---|---|---|---|
| 6,554,469 B1 * | 4/2003 | Thomson et al. | 374/178 |
| 6,554,470 B2 | 4/2003 | Zhang et al. | |
| 6,847,319 B1 | 1/2005 | Stockstad | |
| 7,010,440 B1 * | 3/2006 | Lillis et al. | 374/178 |
| 7,030,793 B2 * | 4/2006 | McLeod et al. | 374/E15.001 |
| 7,112,948 B2 * | 9/2006 | Daly et al. | 323/316 |
| 7,429,129 B2 * | 9/2008 | St. Pierre et al. | 374/178 |
| 2006/0193370 A1 | 8/2006 | St. Pierre et al. | |

FOREIGN PATENT DOCUMENTS

| | | | |
|---|---|---|---|
| EP | 498799 A1 | 8/1992 | |
| EP | 741860 A1 | 11/1996 | |
| GB | 2292221 A | 2/1996 | |

OTHER PUBLICATIONS

S. Kaliyugavaradan, P. Sankaran and V. G. K. Murti; "Application of Reciprocal Time Generation Technique to Digital Temperature Measurement"; IEEE Transactions on Instrumentation and Measurement; Feb. 1994; pp. 99-100; vol. 43, No. 1.

Cao Hui and Huang Junnai; "Circuit Design and Implementation for Digital Temperature and Humidity Measurement and Control"; Proceedings of the 4th International Conference on; Oct. 2001; pp. 502-505.

* cited by examiner

EMI REJECTION FOR TEMPERATURE SENSING DIODES

BACKGROUND OF THE INVENTION

1. Field of the Invention

This invention relates generally to the field of integrated circuit design and, more particularly, to the design of temperature measurement circuits.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Figure 1:
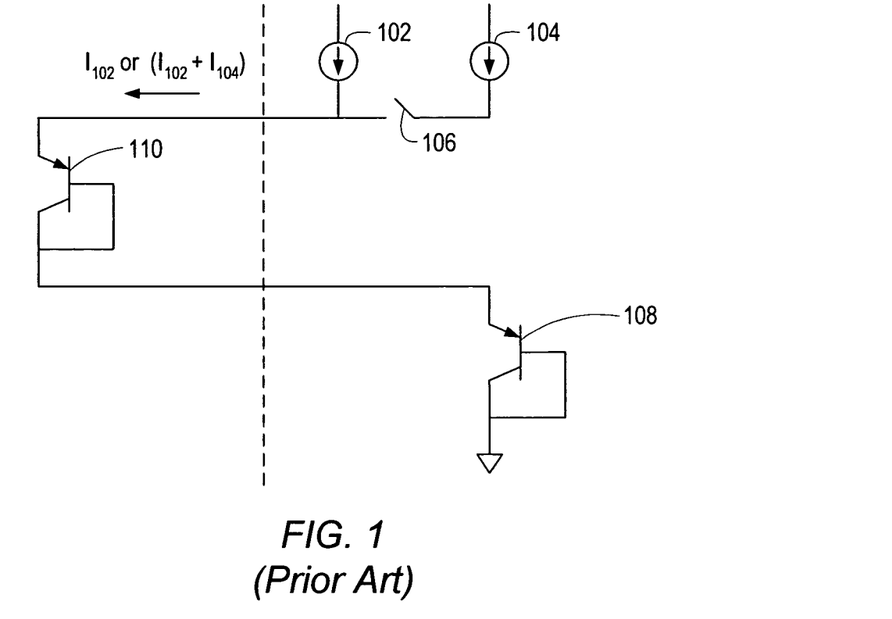
FIG. 1 shows a typical current switching circuit used to deliver at least two different currents to a semiconductor device configured to obtain temperature measurements.

Often, integrated circuit (IC) solutions designed to measure temperature in a system will monitor the voltage across one or more PN-junctions, for example a diode or multiple diodes at different current densities to extract a temperature value. This method generally involves amplifying a small voltage generated on the diode(s), and then subtracting voltage from the amplified temperature-dependent voltage in order to center the amplified value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change ($\Delta V_{BE}$) in the base-emitter voltage ($V_{BE}$) between the diodes is generally proportional to temperature. (It should be noted that while $V_{BE}$ generally refers to a voltage across the base-emitter junction of a diode-connected transistor and not a voltage across a simple PN-junction diode, for the sake of simplicity, $V_{BE}$ is used herein to refer to the voltage developed across a PN-junction in general.) More specifically, $V_{BE}$ may be defined as a function of absolute temperature by the equation $$V_{BE} = \eta \frac{kT}{q} \ln \frac{I_C}{I_S} \quad (1)$$

where $\eta$ is the ideality factor of the PN junction, k is Boltzman's constant, q is the charge of a single electron, T represents absolute temperature, $I_S$ represents saturation current and $I_C$ represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \eta \frac{kT}{q} \ln(N) \quad (2)$$

where N is a constant representing a pre-selected ratio of the two separate currents that are supplied to the PN junction of the diode. FIG. 1 shows one example of a diode-connected transistor 110—a bipolar junction transistor (BJT) in this case—to which a current may be applied via current source 102 when switch 106 is open or via both currents sources 102 and 104 when switch 106 is closed. Current sources 102 and 104 may be configured such that a sum of the currents provided by both current sources is an integer multiple of the single current provided by current source 102. Thus, two separate currents in a predetermined ratio may be supplied to diode-connected BJT 110 in order to obtain a $\Delta V_{BE}$ measurement.

Figure 2:
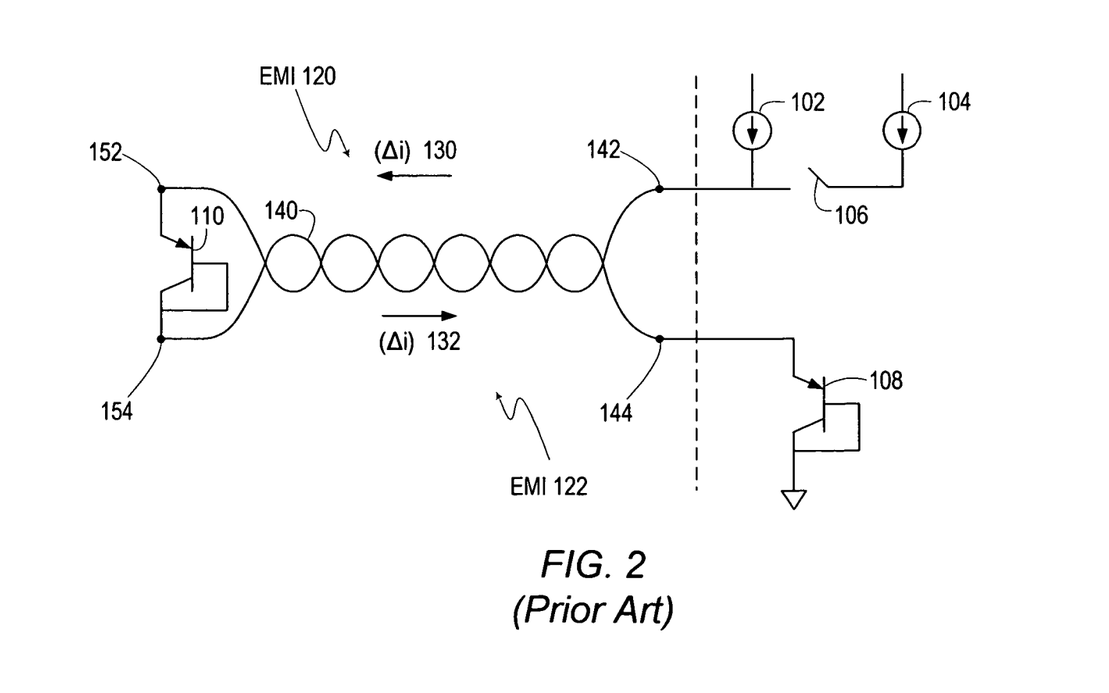
FIG. 2 shows a typical current switching circuit similar to the circuit in FIG. 1, with the semiconductor device being remotely located and coupled to the current sources using a twisted pair of wires.

In many systems, the diode or PN-junction may be configured at a remote location with respect to the measuring device, with the remote diode or PN-junction coupled to the measuring device via a tightly coupled twisted pair of wires or shielded pair of traces on a circuit board. A typical system is illustrated in FIG. 2, where transistor 110 is remotely located with respect to current sources 102 and 104, and is coupled to the current sources via twisted pair wires 140.

One prevalent problem with this method of delivering current to the remote diode or PN-junction when performing temperature measurements is the effects of electromagnetic interference (EMI), more specifically, currents that may be induced by EMI in twisted pair wires 140. For example, in the configuration shown in FIG. 2, the path for a current 132—induced by EMI signal 122 in cathode wire 144—will be through transistor 108 to ground, as the alternate direction would be into current source(s) 102 (and 104), which acting as a high impedance node(s) will impede current flow in that direction. Since induced current 132 will only flow through transistor 108 and not through remote transistor 110, it will typically not result in a temperature measurement error. However, if an EMI signal 120 induces a current 130 in anode wire 142, induced current 130 will travel through remote transistor 110, cathode wire 144 to transistor 108, and finally through transistor 108 to ground. Induced current 130 will take this path due to the high impedance presented at the other end by current source(s) 102 (and 104), which similarly determined the path for induced current 132. Induced current 130, which is generally an AC current, flowing through remote transistor 110 will typically get rectified and produce an error in temperature measurement by effectively modifying the preset current ratio between the two different currents provided to remote transistor 110 by current source 102 and combined current sources 102 and 104, respectively.

A common solution to the EMI problem described above has been to couple a large capacitor (typically in the range of 2200 pF) across remote diode-connected transistor 110. The large capacitor typically shunts EMI signal 120 (and/or EMI signal 122) away from remote transistor 110, keeping the current through transistor 110 substantially constant, thereby preventing EMI induced measurement errors. However, every time the current provided to remote transistor 110 is switched, the capacitor slows down the settling time of the $V_{BE}$ signal developed across the terminals of diode-connected transistor 110, necessitating a longer sampling period for sampling the $V_{BE}$ signal. Slower sampling frequencies in turn lead to longer conversion times and increased power consumption of the measuring devices. In addition, a shunting capacitor typically provides a finite amount of filtering, which may not be sufficient to enable completely accurate measurements. Therefore, it is desirable to develop a system and method to substantially eliminate EMI induced errors while maintaining fast sampling frequencies, thereby providing better temperature measurements.

Other corresponding issues related to the prior art will become apparent to one skilled in the art after comparing such prior art with the present invention as described herein.

SUMMARY OF THE INVENTION

In one set of embodiments, a circuit may be implemented to deliver ratioed currents to a remotely located semiconductor device that has a substantially non-linear input-output characteristic that varies with temperature and is subject to effects of electromagnetic interference (EMI). The circuit may be configured to use common mode rejection to reject EMI signals when performing temperature measurements using the remotely located semiconductor device, obviating the need for shunting capacitor(s) coupled across the terminals of the remotely located semiconductor device. The absence of the shunting capacitor may facilitate maintaining fast sampling rates when performing temperature measurements. The use of common mode rejection may therefore provide a more effective method for handling EMI induced currents that may lead to temperature measurement errors.

In one set of embodiments, a temperature measurement system may include a current delivery circuit configured to deliver ratioed currents to a remotely located semiconductor device, which may be a diode-connected bipolar junction transistor (BJT), used for performing the temperature measurements. The current delivery circuit may comprise two identical resistances and a control circuit having two input terminals and a control terminal, with one of the resistances coupled between the anode of the diode-connected BJT and the control terminal of the control circuit, and the other resistance coupled between the cathode of the diode-connected BJT and ground. The identical resistances may facilitate establishing identical impedances seen at both the anode and the cathode, thereby insuring that currents induced by EMI do not affect the voltage developed across the anode and the cathode.

In one embodiment, the control circuit generates and maintains a constant voltage component (or offset voltage) at the control terminal, thus developing a current (diode current) in the diode-connected BJT, and consequently a base-emitter voltage ($V_{BE}$) across the anode and the cathode of the diode-connected BJT. Through superposition of voltages, the control circuit may maintain a control voltage at the control terminal, where the control voltage is equivalent to a sum of the offset voltage and the $V_{BE}$ developed across the anode and the cathode of the diode-connected BJT. By keeping the control voltage equivalent to the sum of the offset voltage and the $V_{BE}$ (developed across the anode and the cathode of the diode-connected BJT), the control circuit may insure that the offset voltage and the two identical resistances determine the value of the diode current.

In one embodiment, the control circuit may be configured to alternately generate and maintain for a specified amount of time two offset voltages of differing values, where one offset voltage is an integer multiple of the other offset voltage, with each offset voltage resulting in a corresponding $V_{BE}$ voltage, diode current, and control voltage. The temperature system may further include a converter circuit, for example a delta-sigma analog to digital converter, for sampling the different $V_{BE}$ values and generating a digital value corresponding to a temperature of the diode-connected BJT, based on the $\Delta V_{BE}$ obtained according to the $V_{BE}$ samples.

In one set of embodiments, each of the two resistances may be configured as a resistor network consisting of parallel-coupled resistors, where each resistor may be individually switched in and out of its respective resistor network, thereby providing a means for varying the resistance of the respective resistor network. The current delivery circuit may include a control resistor coupled between the control terminal of the control circuit and ground, and a current source configured to deliver a constant current to the control resistor, thereby generating and maintaining the offset voltage at the control terminal. In these embodiments, varying the two resistances, while insuring that the two resistances remain identical, may vary the value of the diode current, thereby producing the required $\Delta V_{BE}$ values for generating a digital temperature reading. The identical resistances may again operate to reduce and/or eliminate effects of EMI on $V_{BE}$.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, the word "alternately" is meant to imply passing back and forth from one state, action, or place to another state, action, or place, respectively. For example, "alternately applying a first current source and a second current source" would mean applying the first current source, then applying the second current source, then applying the first current source, then applying the second current source, and so on. Similarly, "alternately setting to a first value and a second value" would mean setting to the first value, then setting to the second value, then setting to the first value, and so on.

A "diode-junction-voltage" ($V_{BE}$) refers to a voltage measured across the junction of a diode, or a difference in voltage between a voltage measured at the anode of the diode junction with respect to a common ground and a voltage measured at the cathode of the diode junction with respect to the common ground. A "change in diode-junction-voltage" ($\Delta V_{BE}$) refers to a change in diode-junction-voltage for a chosen diode, either in time or in different circuit configurations. For example, if in one circuit configuration $V_{BE}$=700 mV for a diode, and in a different circuit configuration $V_{BE}$=655 mV for the same diode, then $\Delta V_{BE}$=45 mV for the diode when referencing the two different circuit configurations. Similarly, for example, if at a time point t1 $V_{BE}$=650 mV for a diode, and at a time point t2 $V_{BE}$=702 mV for the diode, then $\Delta V_{BE}$=52 mV for the diode when referencing time points t1 and t2.

A diode is one device (or class of devices) that comprises a PN-junction across which voltage measurements to obtain $V_{BE}$ may be made. More generally, diode-junction may also mean PN-junction or NP-junction, characterizing the physical attributes of the junction selected for obtaining temperature values by performing voltage measurements. Various embodiments are described as configured with a diode or multiple diodes. However, in other embodiments, $V_{BE}$ measurements may be achieved via PN-junctions (or NP-junctions) present in devices other than diodes, for example bipolar junction transistors (BJTs). Therefore, the terms PN-junction, NP-junction, diode, diode-junction, and $V_{BE}$ junction are used interchangeably, and all respective terms associated therewith may be interpreted accordingly.

Referring again to FIG. 2, a $\Delta V_{BE}$ may be developed across terminals 152 and 154 of remote transistor 110 as previously described, by alternately forcing a low current ($I_{LOW}$) and high current ($I_{HIGH}$) into the emitter of transistor 110, using current source 102 and combined current sources 102 and 104, respectively. Based on equation (2), $\Delta V_{BE}$ across the base-emitter junction of transistor 110 may then be defined as:

$$\Delta V_{BE} = \eta \frac{kT}{q} * \ln\left(\frac{I_{HIGH}}{I_{LOW}}\right). \qquad (3)$$

It should again be noted that $I_{HIGH}$ may be an integer (N) multiple of $I_{LOW}$. Consequently, the ratio of $I_{HIGH}/I_{LOW}$ may be replaced by the integer factor 'N'. If $\Delta i$ is used to designate any additional current induced in transistor 110, for example current induced by EMI, then $\Delta V_{BE}$ may be re-written to account for the additional induced current as:

$$\Delta V'_{BE} = \eta \frac{kT}{q} * \ln\left(\frac{I_{HIGH} + \Delta i}{I_{LOW} + \Delta i}\right). \qquad (4)$$

The error portion of $\Delta V_{BE}$, i.e. the difference between $\Delta V'_{BE}$ and $\Delta V_{BE}$, may be expressed by:

$$\Delta V'_{BE} - \Delta V_{BE} = \eta \frac{kT}{q} * \left[\ln\left(\frac{I_{HIGH} + \Delta i}{I_{LOW} + \Delta i}\right) - \ln N\right]. \qquad (5)$$

If $\Delta T$ is used to designate the error change in temperature (otherwise referred to as the temperature error) due to the additional induced current $\Delta i$, the difference between $\Delta V'_{BE}$ and $\Delta V_{BE}$, may alternately be expressed as:

$$\Delta V'_{BE} - \Delta V_{BE} = \eta \frac{k \Delta T}{q} * \ln N. \qquad (6)$$

Combining equations (5) and (6), $\Delta T$ may be expressed as:

$$\Delta T = T * \left[\frac{\ln\left(\frac{I_{HIGH} + \Delta i}{I_{LOW} + \Delta i}\right) - \ln N}{\ln N}\right].$$

In one set of embodiments, $\Delta i$ may be an alternating current (AC) assuming a sinusoidal form, and may be expressed as:

$$\Delta i = A * (\sin \omega), \qquad (8)$$

where A is the peak amplitude of induced current $\Delta i$. In one set of embodiments, AC components of the signal may be filtered out, for example when using a delta-sigma ADC to perform the sampling/AD conversion, and the temperature error may be reduced to the average value of the temperature error obtained by integrating equation (7) over $2\pi$ with respect to $\omega$.

$$\Delta T_{AVE} = \frac{T}{2\pi} \int_0^{2\pi} \left[\frac{\ln\left(\frac{I_{HIGH} + A * (\sin \omega)}{I_{LOW} + A * (\sin \omega)}\right) - \ln N}{\ln N}\right] d\omega. \qquad (9)$$

As indicated by equation (9), for any given temperature, the temperature error increases with increasing peak amplitude of induced current $\Delta i$. Furthermore, at higher temperatures the temperature error will be even higher. In order to reduce the error, or possibly eliminate it, a circuit that provides identical resistances at anode pin 152 and cathode pin 154 may be used to provide current to transistor 110, in lieu of current sources 102 and 104.

Figure 3:
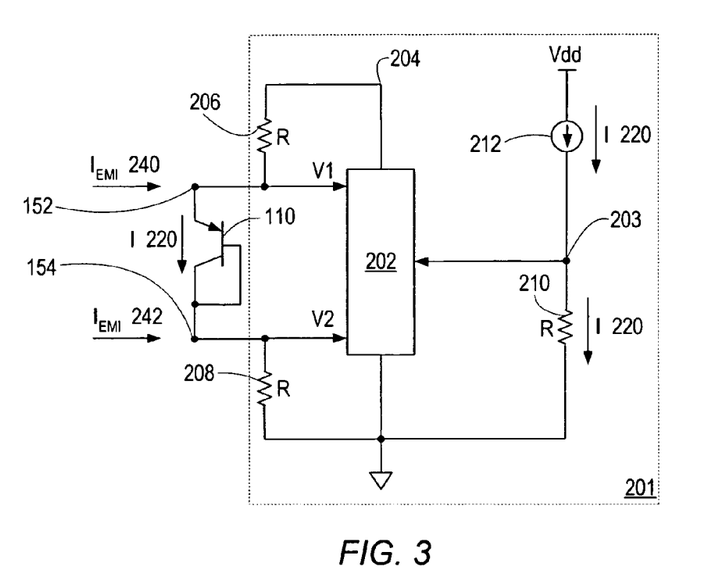
FIG. 3 shows one embodiment of a current delivery circuit configured for delivering current to a semiconductor device in order to obtain temperature measurements.

One embodiment of an input structure 201 configured for delivering a current I 220 to transistor 110 is shown in FIG. 3. Resistors 206 and 208 may have identical values and may be configured between anode terminal 152 and voltage node 204, and cathode terminal 154 and ground, respectively. Functional block (or circuit) 202 may be configured to sense/measure voltages V1 and V2 that appear at terminals 152 and 154, respectively, and to generate a difference voltage V1-V2 corresponding to $V_{BE}$ across terminals 152 and 154 of remote transistor 110. An offset voltage may be developed at node 203 by having current source 212 deliver a current I 220 to resistor 210, where resistor 210 may have a value equal to twice that of resistor 206 (and therefore also equal to twice the value of resistor 208). Thus, the voltage at node 203 may have a value of I*2R. Functional block (or circuit) 202 may operate to drive the total voltage at node 204 to a voltage level that equals the sum of $V_{BE}$ and the offset voltage (I*2R). In other words, the voltage at node 204 may be driven to a level equal to $V_{BE}$+(I*2R), where I represents I 220, and 2*R represents the value of resistor 210, (which, as previously described, is equal to twice that of resistor 206 and to that of resistor 208).

In case of electromagnetic interference, EMI induced currents 240 and 242 that are injected into terminals 152 and 154, respectively, would typically be of equal value. Therefore, V1 and V2 may both either rise or fall according to $I_{EMI}*R$ (R representing the value of resistor 206 and, equally, the value of resistor 208). V1 and V2 changing together, combined with the voltage at node 204 being driven to a level equivalent to a sum of $V_{BE}$ and the offset voltage developed at node 203, the current I 220 flowing through transistor 110 will remain the same. According to the identical impedances presented to potential induced currents at terminals 152 and 154, respectively, the EMI induced currents 240 and 242 may not have an effect on $V_{BE}$ developed across terminals 152 and 154 of remote diode-connected transistor 110.

It should be noted that in alternate embodiments, functional block (or circuit) 202 may be configured to sense/measure the respective voltages across resistor 206 and 208, and compare the sum of those two voltages against the voltage at node 203. According to the result of the comparison, functional block (or circuit) 202 may then operate to bring node 204 to a voltage level such that the sum of the voltage across resistor 206 plus the voltage across resistor 208 equals the voltage across resistor 210. Those skilled in the art will also appreciate that current source 212 may be implemented in a variety of ways, in each case configured to deliver current I 220 to resistor 210.

Figure 4:
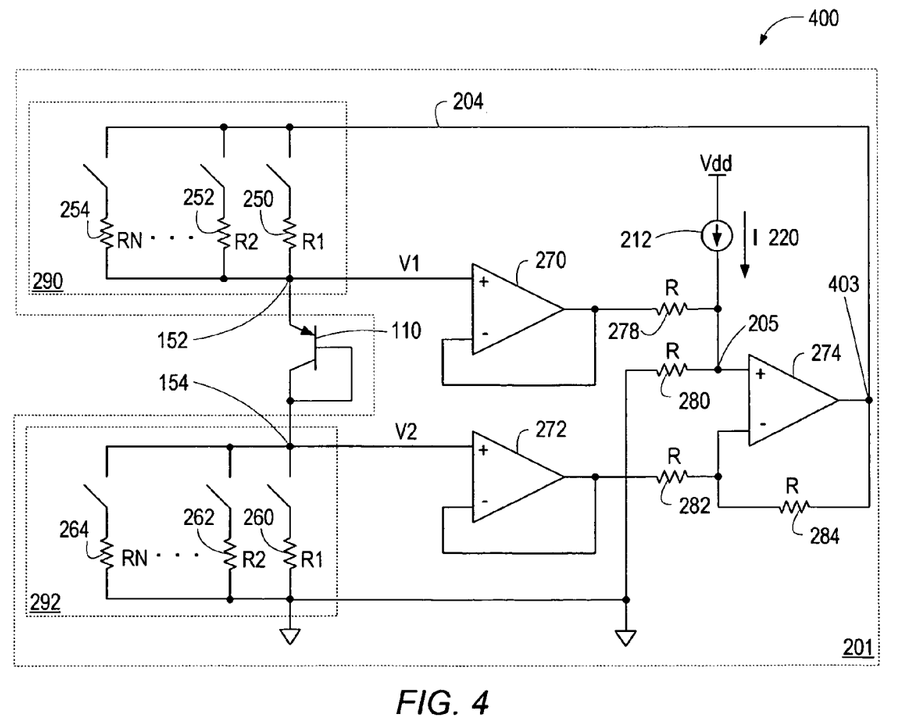
FIG. 4 shows a more detailed embodiment of the current delivery circuit.

In embodiments where remote transistor 110 is to be used for performing temperature measurements, multiple, ratioed currents may need to be applied to remote transistor 110, as opposed to a single current I 220 as shown in FIG. 3. FIG. 4 shows one embodiment of input structure/circuit 201 configured for delivering ratioed currents, according to current I 220, to remote diode-connected transistor 110. In this embodiment, resistor network 290 (corresponding to resistor 206 from FIG. 3), and resistor network 292 (corresponding to resistor 208 from FIG. 3) may allow for changing the current conducted by remote transistor 110, still based on current I 220. The respective resistors in resistor networks 290 and 292 may be configured such that each resistor in one resistor network has a corresponding resistor in the other network. For example, resistor 250 may be identical to resistor 260, resistor 252 may be identical to resistor 262, and so forth. By configuring identical resistor networks 290 and 292, currents of varying values based on I 220 may be provided to transistor 110, while maintaining identical overall resistances at terminals 152 and 154, respectively, thereby insuring minimal or no effect on the temperature measurement from induced EMI currents.

The voltage V1 developed at terminal 152 of transistor 110 may be applied to a non-inverting terminal of buffer 270, and the voltage V2 developed at terminal 154 of transistor 110 may be applied to a non-inverting terminal of buffer 272. The respective outputs of buffers 270 and 272 may be configured to couple to a non-inverting input and an inverting input of amplifier 274, respectively. In one embodiment, amplifier 274 is configured as a difference amplifier, resulting in the output of amplifier 274 reflecting a value of (V1-V2), which corresponds to the $V_{BE}$ voltage developed across transistor 110. Current source 212 may be applied to the terminal coupling resistor 278 and resistor 280 to the non-inverting terminal of amplifier 274. If resistor 278 has a value identical to that of resistor 280, each of those two resistors may conduct one half of current I 220. Therefore, an offset voltage equivalent to (I/2*R) may be developed at terminal 205.

Again, 'I' corresponding to the value of the current supplied by current source 220, and 'R' corresponding to the value of each, resistor 278, resistor 280, resistor 282 and resistor 284, an offset voltage at the output of amplifier 274 may be expressed as:

$$Vos = I*R. \tag{11}$$

It should be noted, that for any specified value I 220 provided by current source 212, Vos may remain constant. Also, according to equation (11), node 403 of FIG. 4 may be considered the equivalent of node 204 of FIG. 3, considering the functionality provided by offset voltage Vos. By way of superposition of voltages, voltage V0 at node 204 may then be written as:

$$V0 = V_{BE} + (I*R). \tag{12}$$

Closing the respective switches corresponding to resistors 254 and 264, with 'R1' corresponding to the value of resistor 254 (and equal to the value of resistor 264), the current $I_{110}$ through transistor 110 may be written as:

$$I_{110} = \frac{V0 - V_{BE}}{2*R1} = \frac{V_{BE} + I*R - V_{BE}}{2*R1} = \frac{I*R}{2*R1}. \tag{13}$$

As indicated by equation (13), current $I_{110}$ is not a function of $V_{BE}$, that is, it is independent of $V_{BE}$. Closing all the respective switches in resistor networks 290 and 292, where each resistor network comprises 'N' resistors, and each of the 'N' resistors has an equal value (that is, R1=R2= . . . =RN), current $I_{110}$ may be written as:

$$I_{110} = \frac{V0 - V_{BE}}{\frac{2}{N}*R1} = \frac{V_{BE} + I*R - V_{BE}}{\frac{2}{N}*R1} = \frac{I*R}{2*R1}*N. \tag{14}$$

As indicated by equation (14), $I_{110}$ may still be expressed independently of $V_{BE}$, and furthermore as a multiple (N) of current I 220 provided by current source 276. Therefore, at least two currents of differing amplitudes, one amplitude being an integer multiple of the other, may be applied to transistor 110, with the accuracy of the current ratio affected only by the matching accuracy of the respective corresponding resistors in resistor networks 290 and 292.

An alternate way of providing different currents to remote transistor 110 may be to not vary the overall resistance in resistor networks 290 and 292, respectively, but to change the current supplied by current source 212 using the proper current ratio. For example, if a first (lower) current provided by current source 212 is designated as having a value of 'I', and using only resistors 250 and 260, $I_{110}$ may be written as:

$$I_{110} = \frac{V0 - V_{BE}}{2*R1} = \frac{V_{BE} + I*R - V_{BE}}{2*R1} = \frac{I*R}{2*R1}, \tag{15}$$

essentially leading to the same result as that of equation (13). If subsequently a second (larger) current supplied by current source 212 is designated as having a value of 'N*I', again using only resistors 250 and 260, $I_{110}$ may be expressed as:

$$I_{110} = \frac{V0 - V_{BE}}{2*R1} = \frac{V_{BE} + (I*N*R) - V_{BE}}{2*R1} = \frac{I*R}{2*R1}*N, \tag{16}$$

essentially leading to the same result as that of equation (14). It should be noted, that when varying the overall resistance in resistor networks 290 and 292, respectively, while keeping the magnitude of the current supplied by current source 212 constant, voltage V0 at node 204 may only vary according to the value of $V_{BE}$ for different value currents supplied to transistor 110. On the other hand, keeping the overall resistance in resistor networks 290 and 292 constant while varying the current supplied by current source 276, voltage V0 at node 204 may additionally change according to the value of the current supplied by current source 212 as well.

As shown in FIG. 4, the impedance to ground may be identical for anode terminal 152 and cathode terminal 154. When identical currents, in this case EMI induced currents, are applied to anode terminal 152 and cathode terminal 154 simultaneously—which would typically be the case for tightly coupled twisted pair wires, such as those shown in FIG. 2—circuit 201 may operate to block the EMI induced currents from flowing through remote diode-connected transistor 110. Therefore, properly ratioed currents may be supplied to remote transistor 110 while simultaneously rejecting EMI induced currents. Since no shunting capacitor(s) is (are) required across the terminals of remote transistor 110, faster sampling rates may be maintained while obtaining highly accurate temperature measurement readings.

Figure 5:
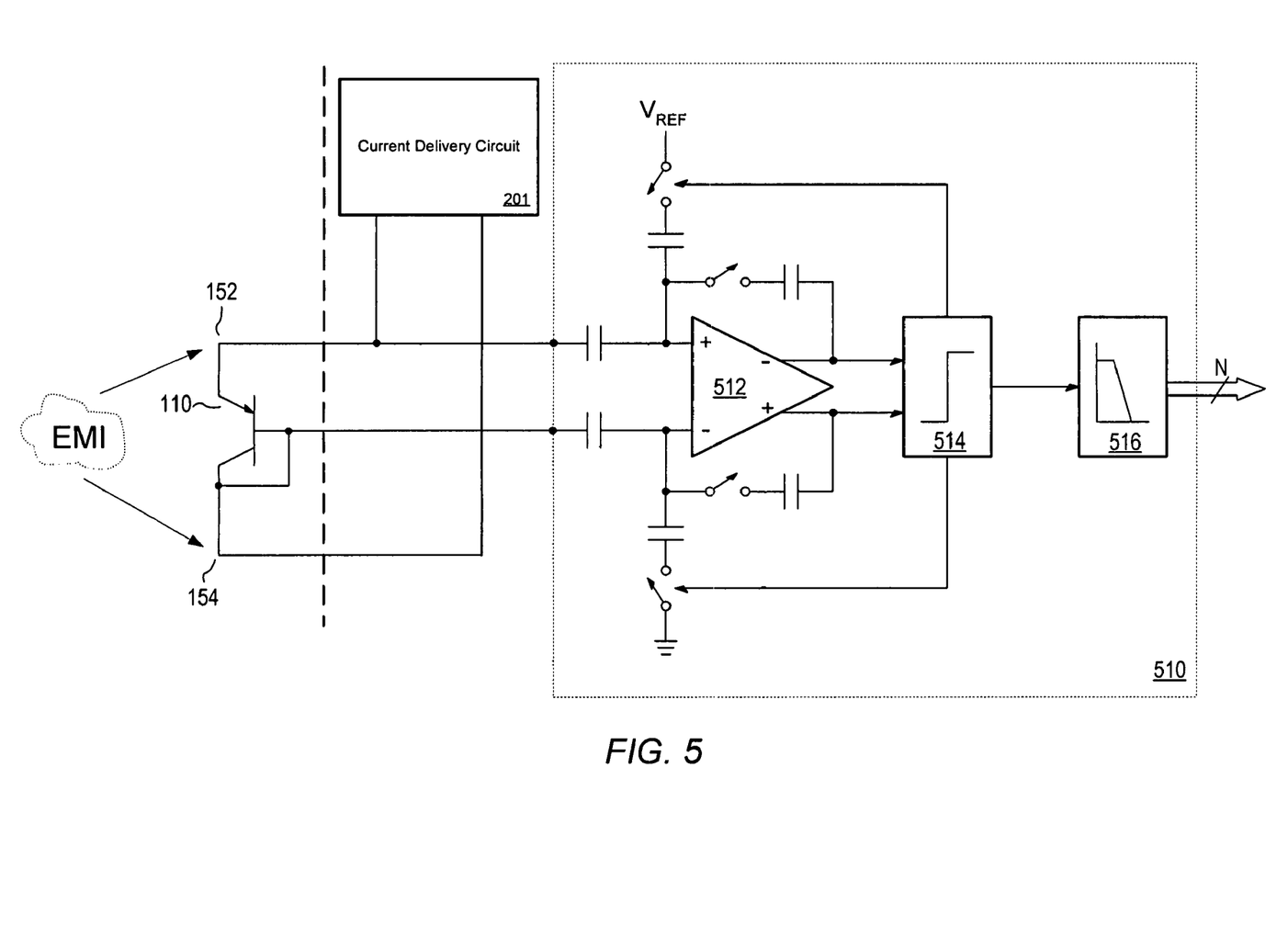
FIG. 5 shows one embodiment of a temperature measurement circuit that utilizes an internal ADC to generate a digital temperature reading.

FIG. 5 illustrates one embodiment of a temperature measurement circuit that utilizes an internal ADC to generate a numeric (i.e. digital) reading of the temperature of a coupled PN-junction, which may be diode-connected remote transistor 110. ADC 510 may operate as a converter circuit operable to sample values of $V_{BE}$ and generate a digital output that corresponds to the temperature of remote transistor 110. As shown in FIG. 5, the base-emitter junction of a transistor 110 may be coupled to ADC 510, which may comprise amplifier 512, quantizer 514, and decimation filter 516 providing the final digital temperature reading, which may be an N-bit binary number. While certain components of ADC 510 are shown for illustrative purposes, ADC 510 is not restricted to the embodiment shown. Those skilled in the art will appreciate that a number of alternate implementations of ADC 510 are possible, and while such alternate implementations are not shown, they are contemplated.

Current delivery circuit 201 may be used to deliver current into the emitter of transistor 110, as previously described, thereby generating a $V_{BE}$ value across the base-emitter junction of transistor 110. In one embodiment, current delivery circuit 201 is configured to provide currents of varying values, as show in the embodiment of FIG. 4. Thus, applying a sequence of different discrete currents to the base-emitter junction of transistor 110 may result in a $\Delta V_{BE}$ value that may be used in generating the desired temperature readings. As also illustrated in FIG. 5, EMI noise coupling to anode terminal 152 and cathode terminal 154, whose effect on the $V_{BE}$ value across terminals 152 and 154 may be minimized and/or eliminated as a result of the configuration of current delivery circuit 201 as previously shown.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A system comprising:
    a control circuit having a first terminal, a second terminal, and a control terminal, wherein the first terminal is configured to couple to an input terminal of a semiconductor device and the second terminal is configured to couple to an output terminal of the semiconductor device, wherein the control circuit is operable to generate a constant voltage component at the control terminal, thereby developing a first device-current in the semiconductor device;
    a first resistance having a specified value and configured to couple between the first terminal and the control terminal; and
    a second resistance having the specified value and configured to couple between the second terminal and ground;
    wherein the control circuit is operable to maintain a first control voltage at the control terminal, wherein the first control voltage is equivalent to a sum of the constant voltage component plus a first device-voltage developed across the input terminal and the output terminal of the semiconductor device in response to the first device-current; and
    wherein in accordance with the maintained first control voltage, the first device-current is determined by the constant voltage component, the first resistance, and the second resistance.

2. The system of claim 1, wherein in accordance with the first resistance having a specified value and being configured to couple between the first terminal and the control terminal, and the second resistance having the specified value and being configured to couple between the second terminal and ground, the first device-voltage remains unaffected by electromagnetic interference (EMI).

3. The system of claim 1 wherein the semiconductor device has a specified, non-linear input-output characteristic that varies with temperature.

4. The system of claim 3, further comprising:
    a third resistance configured to couple to the control terminal; and
    a current source operable to provide a first current to the third resistance to generate and maintain the constant voltage component, wherein the constant voltage component is equivalent to a product of the first current and the third resistance.

5. The system of claim 4, wherein the current source is operable to alternately provide the first current and at least a second current that is a multiple of the first current to the third resistor, wherein while providing the second current, the current source is operable to change the constant voltage component and maintain the changed constant voltage component, thereby developing a second device-current in the semiconductor device, wherein the changed constant voltage component is equivalent to a product of the second current and the third resistance;
    wherein while the current source is providing the second current to the third resistor, the control circuit is operable to maintain a second control voltage at the control terminal, wherein the second control voltage is equivalent to a sum of the changed constant voltage component plus a second device-voltage developed across the input terminal and the output terminal of the semiconductor device in response to the second device-current; and
    wherein in accordance with the maintained second control voltage, the second device-current is determined by the changed constant voltage component, the first resistance, and the second resistance.

6. The system of claim 5, further comprising a converter circuit operable to sample the first device-voltage and the second device-voltage, and produce a numeric value according to a difference between the first device-voltage and the second device-voltage, wherein the numeric value corresponds to a temperature of the semiconductor device.

7. The system of claim 6, wherein the first resistance and the second resistance are each configured to be variable, with the specified value being selectable.

8. The system of claim 7, wherein the first resistance comprises a first plurality of resistors and the second resistance comprises a second plurality of resistors;
   wherein each one of the first plurality of resistors is individually switchable to couple in parallel with any other one of the first plurality of resistors;
   wherein each one of the second plurality of resistors is individually switchable to couple in parallel with any other one of the second plurality of resistors;
   wherein the specified value is determined by switching selected ones of the first plurality of resistors to couple in parallel with one another, and by switching selected ones of the second plurality of resistors to couple in parallel with one another.

9. The system of claim 8, wherein each one of the first plurality of resistors and each one of the second plurality of resistors has a same value.

10. The system of claim 7, wherein the first device-current, the first device-voltage, and the first control voltage correspond to a first value being selected as the specified value;
   wherein for a second value being selected as the specified value:
      by generating the constant voltage component, the control circuit is operable to develop a second device-current in the semiconductor device; and
      the control circuit is operable to maintain a second control voltage at the control terminal, wherein the second control voltage is equivalent to a sum of the constant voltage component plus a second device-voltage developed across the input terminal and the output terminal of the semiconductor device in response to the second device-current; and
      wherein in accordance with the maintained second control voltage, the second device-current is determined by the constant voltage component, the first resistance, and the second resistance.

11. The system of claim 10, further comprising a converter circuit operable to sample the first device-voltage and the second device-voltage, and produce a numeric value according to a difference between the first device-voltage and the second device-voltage, wherein the numeric value corresponds to a temperature of the semiconductor device.

12. The system of claim 1, wherein the control circuit comprises:
   a first amplifier having a first output, a non-inverting input terminal configured as the first terminal, and an inverting input terminal configured to couple to the first output;
   a second amplifier having a second output, a non-inverting terminal configured as the second terminal, and an inverting terminal configured to couple to the second output; and
   a third amplifier having a non-inverting input configured to couple to the first output, an inverting input configured to couple to the second output, and a third output configured as the control node.

13. The system of claim 12, further comprising:
   a third resistance configured to couple between the non-inverting input of the third amplifier and ground;
   a fourth resistance configured to couple between the non-inverting input of the third amplifier and the first output; and
   a current source configured to couple to the non-inverting input of the third amplifier, wherein the current source is operable to provide a portion of the first current to the third resistance and a remaining portion of the first current to the fourth resistance to generate and maintain the constant voltage component, wherein the constant voltage component is equivalent to a product of the first current and the third resistance.

14. The system of claim 13, wherein the semiconductor device comprises one of:
   a diode; and
   a diode-connected bipolar junction transistor;
   wherein the device-voltage comprises a base-emitter voltage ($V_{BE}$).

15. A method comprising:
   establishing respective identical impedances at an input terminal of a semiconductor device and an output terminal of the semiconductor device;
   generating a constant voltage component at a control terminal configured to couple to the input terminal of the semiconductor device;
   the semiconductor device conducting a first device-current in response to said generating the constant voltage component;
   maintaining a first control voltage at the control terminal, wherein the first control voltage is equivalent to a sum of the constant voltage component plus a first device-voltage developed across the input terminal and the output terminal of the semiconductor device in response to the first device-current;
   wherein in accordance with said maintaining the first control voltage, the first device-current is determined by the constant voltage component and respective ohmic components of the identical impedances.

16. The method of claim 15, wherein in accordance with the identical impedances, the first device-voltage remains unaffected by electromagnetic interference (EMI).

17. The method of claim 15, wherein the semiconductor device has a specified, non-linear input-output characteristic that varies with temperature.

18. The method of claim 17, further comprising:
   changing the constant voltage component, and maintaining the changed constant voltage component;
   the semiconductor device conducting a second device-current in response to said changing the constant voltage component, and maintaining the changed constant voltage component;
   maintaining a second control voltage at the control terminal, wherein the second control voltage is equivalent to a sum of the changed constant voltage component plus a second device-voltage developed across the input terminal and the output terminal of the semiconductor device in response to the second device-current;
   wherein in accordance with said maintaining the second control voltage, the second device-current is determined by the changed constant voltage component and respective ohmic components of the identical impedances.

19. The method of claim 18, further comprising:
   sampling the first device-voltage and the second-device voltage;
   producing a numeric value according to a difference between the first device-voltage and the second device-voltage;
   wherein the numeric value corresponds to a temperature of the semiconductor device.

20. The method of claim 15, wherein said generating the constant voltage component comprises:

generating and providing a first current to a resistance configured to couple to the control terminal;

wherein the constant voltage component is equivalent to a product of the first current and the resistance.

21. The method of claim 20, further comprising:

generating and providing a second current to the resistance;

the constant voltage component changing in response to said generating and providing the second current;

maintaining the changed constant voltage component;

the semiconductor device conducting a second device-current in response to said maintaining the changed constant voltage component; and maintaining a second control voltage at the control terminal, wherein the second control voltage is equivalent to a sum of the changed constant voltage component plus a second device-voltage developed across the input terminal and the output terminal of the semiconductor device in response to the second device-current;

wherein in accordance with said maintaining the second control voltage, the second device-current is determined by the changed constant voltage component and respective ohmic components of the identical impedances.

22. The method of claim 21, further comprising:

sampling the first device-voltage and the second-device voltage;

producing a numeric value according to a difference between the first device-voltage and the second device-voltage;

wherein the numeric value corresponds to a temperature of the semiconductor device.

23. The method of claim 22, further comprising:

performing said generating and providing the first current, said generating and maintaining the constant voltage component, said maintaining the first control voltage, said generating and providing the second current, said maintaining the changed constant voltage component, said maintaining the second control voltage, said sampling, and said producing the numeric value a plurality of times.

24. The method of claim 22, wherein said sampling and said producing the numeric value are performed by a delta-sigma analog to digital converter.

25. A temperature measurement system comprising:

a semiconductor device having an input terminal, an output terminal, and a specified, non-linear input-output characteristic that varies with temperature;

a control circuit having a first terminal, a second terminal, and a control terminal, wherein the first terminal is configured to couple to the input terminal of the semiconductor device and the second terminal is configured to couple to the output terminal of the semiconductor device;

a first resistance configured to couple to the control terminal;

a second resistance having a specified value and configured to couple between the first terminal and the control terminal;

a third resistance having the specified value and configured to couple between the second terminal and ground; and a current source configured to alternately provide to the first resistance:

a first current for developing a corresponding first constant voltage component at the control terminal and a corresponding first device-current in the semiconductor device; and a second current for developing a corresponding second constant voltage component at the control terminal, and a corresponding second device-current in the semiconductor device;

wherein the first constant voltage component is equivalent to a product of the first current and the first resistance, and the second constant voltage component is equivalent to a product of the second current and the first resistance;

a converter circuit operable to sample a first device-voltage developed across the input terminal and the output terminal of the semiconductor device in response to the first device-current and a second device-voltage developed across the input terminal and the output terminal of the semiconductor device in response to the second device-current, and to generate a numeric value according to a difference between the first device-voltage and the second device-voltage, wherein the numeric value corresponds to a temperature of the semiconductor device;

wherein the control circuit is operable to alternately maintain a first control voltage and a second control voltage at the control terminal, wherein the first control voltage is equivalent to a sum of the first constant voltage component plus the first device-voltage, and the second control voltage is equivalent to a sum of the second constant voltage component plus the second device-voltage; and wherein in accordance with the maintained first control voltage, the first device-current is determined by the first constant voltage component, the second resistance, and the third resistance, and in accordance with the maintained second control voltage, the second device-current is determined by the second constant voltage component, the second resistance, and the third resistance.

26. A temperature measurement system comprising:

a semiconductor device having an input terminal, an output terminal, and a specified, non-linear input-output characteristic that varies with temperature;

a first resistor network having two end terminals, and configured to have a settable resistance, and further configured to have one of its two end terminals coupled to the input terminal of the semiconductor device;

a second resistor network having two end terminals, and configured to have a settable resistance, and further configured to have one of its two end terminals couple to the output of the semiconductor device and the other of its two end terminals couple to ground;

a control circuit having a first terminal, a second terminal, and a control terminal, wherein the first terminal is configured to couple to the input terminal of the semiconductor device, the second terminal is configured to couple to the output terminal of the semiconductor device, and the control terminal is configured to couple to the other of the two end terminals of the first resistor network, wherein the control circuit is operable to:

alternately set to a first resistance and a second resistance both the first resistor network and the second resistor network simultaneously;

when the first resistor network and the second resistor network are set to the first resistance, generate and maintain an constant voltage component at the control terminal to develop a first device-current in the semiconductor device, and maintain a first control voltage at the control terminal, wherein the first control voltage is equivalent to a sum of the constant voltage component plus a first device-voltage developed across the input terminal and the output terminal of the semiconductor device in response to the first device-current;

when the first resistor network and the second resistor network are set to the second resistance, generate and maintain the constant voltage component at the control terminal to develop a second device-current in the semiconductor device, and maintain a second control voltage at the control terminal, wherein the second control voltage is equivalent to a sum of the constant voltage component plus a second device-voltage developed across the input terminal and the output terminal of the semiconductor device in response to the second device-current; and a converter circuit operable to sample the first device-voltage and the second device-voltage, and produce a numeric value according to a difference between the first device-voltage and the second device-voltage, wherein the numeric value corresponds to a temperature of the semiconductor device;

wherein in accordance with the maintained first control voltage, the first device-current is determined by the constant voltage component, the second resistance, and the third resistance, and in accordance with the maintained second control voltage, the second device-current is determined by the constant voltage component, the second resistance, and the third resistance.

* * * * *

UNITED STATES PATENT AND TRADEMARK OFFICE
CERTIFICATE OF CORRECTION

PATENT NO. : 7,622,903 B2 Page 1 of 1
APPLICATION NO. : 11/219151
DATED : November 24, 2009
INVENTOR(S) : Scott C. McLeod It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-sixth Day of October, 2010

David J. Kappos
*Director of the United States Patent and Trademark Office*